United States Patent [19]
Wertheimer et al.

[11] Patent Number: 5,920,630
[45] Date of Patent: Jul. 6, 1999

[54] METHOD OF PUBLIC KEY CRYPTOGRAPHY THAT INCLUDES KEY ESCROW

[75] Inventors: Michael A. Wertheimer; Boyd T. Livingston, both of Columbia; Tad P. White, Odenton; Benjamin M. Bielefeld, Severn; Thomas H. Monroe; J. William Pendergrass, both of Columbia, all of Md.

[73] Assignee: United States of America, Washington, D.C.

[21] Appl. No.: 08/805,967

[22] Filed: Feb. 25, 1997

[51] Int. Cl.$^6$ .................................................. H04K 1/00
[52] U.S. Cl. ............................... 380/25; 380/30; 380/25; 380/45; 380/44
[58] Field of Search .................................. 380/25, 28, 29, 380/30, 43, 45, 46, 47, 49

[56] References Cited

U.S. PATENT DOCUMENTS 5,124,117  6/1992  Tatebayashi ............................ 380/21
5,150,411  9/1992  Maurer .................................... 380/30

(List continued on next page.)

OTHER PUBLICATIONS

A Taxonomy for Key Escrow Encryption Systems, Denning et al., Comm. of the ACM Mar. 1996.
Description of Key Escrow Systems, Denning, Internet, May 1, 1996.
A Key Escrow System with Warrant Bounds, Lenstra et al., Adv. in Cryptology—Crypto '95, 1995, pp. 197–207.
Federal Information Processing Standards Publication 185 Escrowed Encryption Standard (EES) National Institutes of Standards and Technologiy, Feb. 9, 1994.
Dorothy Denning "Key Escrowing Today", IEEE Communications Magazine pp. 58–68, Sep. 1994.
James Nechvatal "A Public–Key Based Key Escrow System" Elsevier Science Inc., Dec. 1996.
Yung–Cheng Lee et al. "On the Key Recovery of the Key Escrow System" IEEE pp. 216–220, Aug. 1, 1986.

*Primary Examiner*—Tod R. Swann
*Assistant Examiner*—Paul E. Callahan
*Attorney, Agent, or Firm*—Robert D. Morelli

[57] ABSTRACT

A key escrow encryption method, where two users each have secret encryption keys and corresponding public encryption keys. One user receives the public encryption keys of the other user and generates a first datum based on them, an identifier of the other user, the secret encryption keys and identifier of the user, and an access restriction. The user generates a second datum based on the first datum and another access restriction. The user generates a key based on the first and second datums. The user encrypts a message using the key and sends it to the other user. Key escrow is included by requiring each user to distribute its secret encryption keys among escrow agents. The escrow agents transform, sign, and transmit it to a certifying authority. The certifying authority signs and publishes it as user's public key certificate. To communicate, a user retrieves the certificate of the other user, forms a key, encrypts a message, and transmits it to the other user. The other user retrieves the certificate of the user, forms the key, and decrypts the message. A key encryption key scheme may be used. A third party may intercept the message, receive authorization, receive portions of the key from the escrow agents, recover the key, and recover the message. A data recovery scheme may be used.

53 Claims, 5 Drawing Sheets

U.S. PATENT DOCUMENTS

| | | | |
|---|---|---|---|
| 5,199,070 | 3/1993 | Matsuzaki et al. | 380/30 |
| 5,276,737 | 1/1994 | Micali | 380/30 |
| 5,315,658 | 5/1994 | Micali | 380/30 |
| 5,436,972 | 7/1995 | Fischer | 380/25 |
| 5,481,613 | 1/1996 | Ford et al. | 380/30 |
| 5,535,276 | 7/1996 | Ganesan | 380/25 |
| 5,557,346 | 9/1996 | Lipner et al. | 380/21 |
| 5,557,678 | 9/1996 | Ganesan | 380/21 |
| 5,557,765 | 9/1996 | Lipner et al. | 380/21 |
| 5,606,617 | 2/1997 | Brands | 380/30 |
| 5,631,961 | 5/1997 | Mills et al. | 380/30 |
| 5,633,928 | 5/1997 | Lenstra et al. | 380/21 |
| 5,633,929 | 5/1997 | Kaliski et al. | 380/23 |
| 5,745,573 | 4/1998 | Lipner et al. | 380/21 |
| 5,768,388 | 6/1998 | Goldwasser et al. | 380/30 |
| 5,796,830 | 8/1998 | Johnson et al. | 380/21 |
| 5,799,086 | 8/1998 | Saudia | 380/23 |
| 5,815,573 | 9/1998 | Johnson et al. | 380/21 |
| 5,841,613 | 1/1996 | Ford et al. | 380/30 |
| 5,841,865 | 11/1998 | Saudia | 380/21 |
| 5,850,451 | 12/1998 | Saudia | 380/21 |
| 5,852,665 | 12/1998 | Gressel et al. | 380/30 |
| 5,857,022 | 1/1999 | Saudia | 380/23 |

METHOD OF PUBLIC KEY CRYPTOGRAPHY THAT INCLUDES KEY ESCROW

FIELD OF THE INVENTION

This invention relates to cryptography and, more particularly, to a method of public key cryptography that includes key escrow.

BACKGROUND OF THE INVENTION

Cryptography involves the transmission of an encrypted message from one party to another. The message is encrypted using a mathematical function known as a cryptographic algorithm, which for security reasons allows for a large number of initial settings, the selection being determined by a cryptographic key. The cryptographic algorithm must be complex enough so that the encrypted message cannot be decrypted by an unintended party if the cryptographic algorithm is known but the key is not. If both the algorithm and the key are known by an unintended party then the unintended party may decrypt the encrypted message. Typically, the algorithm is known to all, but the key is known only by the intended parties. Therefore, the security of the encrypted message lies in maintaining the secrecy of the key.

An unencrypted message (i.e., plaintext) is encrypted (i.e., converted to ciphertext) by a sender by using a cryptographic system to mathematically alter the plaintext using a cryptographic algorithm and a key. An intended receiver recovers the plaintext by mathematically altering the ciphertext using a crypto-algorithm and a key in a manner that is the mathematical inverse of the mathematical function performed by the sender.

Modern cryptographic systems fall into two categories: symmetric-key crypto-systems and public-key crypto-systems. A symmetric-key crypto-system is one in which the encryption key and the decryption key are computable from one another (the keys are often the same), so that one secret must be agreed upon off-line by the users before secure communication can take place. A public-key crypto-system is one in which the decryption key cannot feasibly be computed from the encryption key, so that the encryption key can be made public without compromising the security of the system. Having two different keys for encryption and decryption, where knowledge of the encryption key does not betray the decryption key, solves a problem that exists in a symmetric-key system (i.e., key distribution) and enables the parties to perform additional functions (i.e., electronic key exchange, non-repudiation, and message authentication).

Cryptography used to be practiced only by governments that had cryptographic expertise and the money to afford such equipment. However, it is envisioned that reasonably priced cryptographic equipment will become commercially available to the general public. Eventually, all communications may be encrypted. This is good for preventing espionage from being performed on our citizens by foreign powers, but it may also prevent our own law enforcement professionals from conducting authorized wiretaps. Key escrow, which is described below, is being proposed as a solution to the law enforcement problem. Key escrow also has uses outside of law enforcement (e.g., corporate monitoring of customer hotlines for quality control).

The term "key escrow" is used to refer to a scheme of allowing an authorized third party access to the key used to encrypt communications between a first party and a second party. That which is escrowed may be the key itself, or a more primitive element of the system from which the session key (i.e., the key used to encrypt the communications between the first party and the second party in a particular communication session) can be computed. Most key escrow schemes involve procedures that place them among one or more of the following three varieties.

The first variety of key escrow is one where the session key, essentially unaltered, or a short term secret from which the session key is produced (during the validity period of the short term secret), is given to one or more trustees. If multiple trustees are used, each trustee may hold the entire session key or a portion thereof. A third party wanting access to the session key would go to the trustee or trustees and ask for the session key or the portions thereof. Some sort of authorization process (e.g., corporate approval, law enforcement warrant, etc.) is required to prevent access to the session key by an unauthorized third party.

The second variety of key escrow requires, for each secure communication, the transmission, either by the sender or by both parties, of additional data not necessary for the first and second parties. The additional data, sometimes in the form of ancillary messages, is constructed in a way that allows an authorized third party to recover the session key either directly or with the authorized cooperation of the one or more trustees. Two terms are presently being used to describe additional data transmitted by the sender: law enforcement access field (LEAF) and data recovery field (DRF). The LEAF, or DRF, is not needed by either the first or second party for secure communication and, as such, is per-message overhead. Furthermore, the additional data need not be readable by the communicating parties. Therefore, misuse of the system by an intentional corruption of the LEAF or the DRF may be undetectable by an honest user. A requirement to send extra messages for the purpose of enabling authorized third party access is generally considered more of a burden than increasing the length of a message already intended to be sent by a user (as in appending a LEAF). Furthermore, the exchange of preliminary messages (often referred to as a handshake) prior to communication may preclude a system's use in some very important applications (such as e-mail) in which both users need not be concurrently on line to communicate.

The third variety of key escrow is one where a long term secret, from which per message session keys are derived, is given to one or more trustees. This variety often involves incorporating key escrow into the enrollment process of the system, in which session keys themselves are not stored, but rather long term data used in the production of session keys is escrowed. As the session keys subsequently computed depend only on the escrowed data and known quantities (e.g., the time of communication), there need be no per message overhead to enable authorized third party access to session keys. The present invention is of this third variety.

Dorothy E. Denning and Dennis K. Branstad wrote a survey of existing key escrow schemes in a paper entitled "A Taxonomy for Key Escrow Encryption Systems," published in *Communications of the ACM*, in March, 1996. Ms. Denning updated this survey in a paper entitled "Description of Key Escrow Systems," Version of May 1, 1996, available on the INTERNET (at http://guru.cosc.georgetown.edu/~denning/crypto/Appendix.html). The updated survey is a compilation of descriptions, apparently submitted by the creators, of existing key escrow schemes. From the brief descriptions given in this paper, it appears that most of the key escrow schemes contained therein are of either the first variety (i.e., escrow the unaltered session key or the short term secrets from which session key is produced with one or more trustees) or of the second variety (i.e., append a LEAF or DRF to the encrypted communication or require some form of handshake for the purpose of enabling authorized third party access). The key escrow scheme described by Arjen K. Lenstra, Peter Winkler, and Yacov Yacobi, in a paper entitled "A Key Escrow System with Warrant Bounds," *Advances in Cryptology—Crypto '95 Proceedings*, Springer-Verlag, 1995, pp 197–207, is significantly different from the present invention but may come the closest to the present invention of any published key escrow scheme because it is a key escrow scheme not only of the second variety but also of the third variety.

In the method of Lenstra et al., two users (e.g., User A and User B) who wish to communicate securely each generate, or are given, a Diffie-Hellman public key pair (based on a large prime integer p and a positive integer g) consisting of a public encryption key $P_i$ and a secret encryption key $S_i$, where $P_i$ and $S_i$ are related by $P_i=g^{\wedge}S_i \bmod p$, where "^" denotes exponentiation. That is, User A possesses $P_A$ and $S_A$ while User B possesses $P_B$ and $S_B$. The secret encryption keys of the users are escrowed unaltered with one or more trustees. Each user publishes its public encryption key in a directory that is available to the other user.

Next, User A generates the session key k(A,B,d) that will be used to encrypt messages between the two users. The session key is generated using the secret encryption key $S_A$ of User A, the public encryption key $P_B$ of User B, and the date of the intended communication. More precisely, the session key is generated using a one-way hash function h to hash the date into a number formed by raising $P_B$ to $S_A$ in a manner similar to the Diffie-Hellman key-exchange method (i.e., U.S. Pat. No. 4,200,770). U.S. Pat. No. 4,200,770 is hereby incorporated by reference into the specification of the present invention. That is, User A generates k(A,B,d)= $h(P_B{\wedge}S_A,d)$. User B generates the session key in a slightly different, but mathematically equivalent, manner, i.e., $k(B,A,d)=h(P_A{\wedge}S_B,d)=k(A,B,d)$.

Next, Lenstra et al. requires each user to generate a key encryption key for encrypting the session key. The encrypted session key is then used as a LEAF. The key encryption key generated by each user is not known by the other user. User A generates $S(A,B,d)=h(h(S_A,d),P_B)$. User B generates S(B, A,d)=$h(h(S_B,d),P_A)$. The key encryption key of each user is tied to the other user through the public encryption key of the other user.

Next, Lenstra et al. requires each user to encrypt its session key with its key encryption key and transmit the result (i.e., the LEAF). The LEAF, which the other user cannot decrypt, is transmitted solely for the benefit of an authorized third party.

Next, Lenstra et al. requires an authorized third party, who intercepts an encrypted communication between User A and User B, to present some form of authorization and the date the encrypted communication was sent to the one or more trustees in order to get one of three datums.

If the third party is authorized to decrypt all messages between User A and User B on a given date regardless of the direction of the communication (i.e., User A to User B or vice versa) then the one or more trustees will give the third party the key encryption key S(A,B,d) of one of the users. For example, if the third party is interested in User A's communications then User A's key encryption key S(A,B,d) will be given to the third party. This datum enables the third party to decrypt the LEAF transmitted for the third party's benefit (i.e., the session key k(A,B,d) encrypted with the key encryption key S(A,B,d)). After recovering k(A,B,d), the third party may decrypt all communications for which it is the session key (presumably on the date k(A,B,d) was created) between the users (irrespective of the direction of the communication; User A to User B or vice versa). This is the most restrictive access granted by Lenstra et al. Technically, the datum enables the third party to decrypt messages any time the session key is used by the users, but if the users use the session key only on the date it is created then the datum given to the third party will only enable the third party to decrypt messages between the two users on that date.

If the third party is authorized to decrypt all messages sent or received by a particular user (e.g., User A) to any other second party (e.g., User C as well as User B) on a particular date then the third party is given the hash of the secret encryption key of the user and the date in question (e.g., $h(S_A,d)$). This datum is used in producing any key encryption key generated (e.g., S(A,B,d), S(A,C,d), etc.) by the user on the date in question for any other user (e.g., User B, User C, etc.). Knowing this datum, the hash function, and the public encryption key of the user, the third party may reconstruct the user's key encryption key.

If a third party is authorized to decrypt all messages sent by a particular user on any day and the LEAF is corrupted or absent (e.g., the user tries to deny access by an authorized third party), the third party is given the secret encryption key of that particular user (e.g., $S_A$ for User A). With this, the third party may create all datums required to decrypt the messages received by or sent from the user. This situation remains in effect until the user gets a new public key.

The significant differences between the key escrow scheme of Lenstra et al. and the present invention are that (1) the present invention is not of the second variety, whereas Lenstra et al. is of the second variety, that is, the present invention does not require per message overhead for authorized third party access (a LEAF or the consequent generation of a key encryption key) as in the key escrow scheme of Lenstra, et al.;

(2) the present invention may restrict access to messages based on the direction of the message (i.e., who sent the message to whom) whereas Lenstra et al. does not;

(3) the present invention includes multiple policy-definable access restriction levels whereas Lenstra et al. only uses one (i.e., date);

(4) in the present invention, if one of a pair of users is honest, cooperating with the protocol set forth in the present invention, then secure communication can only take place if the other is honest: secure communication thus guarantees each user that the other is not circumventing authorized third party access;

(5) the present invention never reveals the secret encryption key of a user to the authorized third party whereas Lenstra et al. may.

U.S. Pat. No. 5,535,276, entitled "YAKSHA, AN IMPROVED SYSTEM AND METHOD FOR SECURING COMMUNICATIONS USING SPLIT PRIVATE KEY ASYMMETRIC CRYPTOGRAPHY," is a patent on the key escrow scheme described in the Denning papers listed above. The key escrow scheme of U.S. Pat. No. 5,535,276 is of the first variety listed above. The present invention is not of the first variety listed above. U.S. Pat. No. 5,535,276 is hereby incorporated by reference into the specification of the present invention.

U.S. Pat. No. 5,557,765, entitled "SYSTEM AND METHOD FOR DATA RECOVERY," discloses a key escrow scheme of the second variety (i.e., one that includes a data recovery field). U.S. Pat. No. 5,557,765 is a patent on a key escrow scheme attributed to Trusted Information Systems, Inc. in the Denning papers listed above. The present invention is not of the second variety key escrow scheme listed above. U.S. Pat. No. 5,557,765 is hereby incorporated by reference into the specification of the present invention.

U.S. Pat. Nos. 5,276,737 and 5,315,658, both entitled "FAIR CRYPTOSYSTEMS AND METHODS OF USE," disclose three key escrow schemes. One, in which secret encryption keys are escrowed, allows authorized third parties to reconstruct a user's secret encryption key, allowing access to all messages sent to or from the user for all time. In contrast, the present invention restricts access in both time and direction of communication, and furthermore never reveals secret encryption keys. A second one achieves time-boundedness of access to authorized third parties by requiring users to escrow multiple secret encryption keys (e.g., one each month), so that a secret encryption key reconstructed by an authorized third party eventually expires. As such, this system is of the first variety, whereas the present invention is not of the first variety. A third one achieves time boundedness of access to authorized third parties but requires three messages to be passed between the users. Since the last two are unnecessary for communication, and are sent only to enable authorized third party access, this system is of the second variety whereas the present invention is not of the second variety. U.S. Pat. Nos. 5,276,737 and 5,315,658 are hereby incorporated by reference into the specification of the present invention.

U.S. Pat. No. 5,436,972, entitled "METHOD FOR PREVENTING INADVERTENT BETRAYAL BY A TRUSTEE OF ESCROWED DIGITAL SECRETS," is rather a data recovery scheme than a key escrow scheme used for secure communication. U.S. Pat. No. 5,436,972 adds to the secret information that is provided to one or more trustees additional identification information, whereas the present invention accomplishes data recovery with no additional overhead. Furthermore, in U.S. Pat. No. 5,436,972, the escrow agent and data recovery center are one and the same, whereas in the present invention they are not. U.S. Pat. No. 5,436,972 is hereby incorporated by reference into the specification of the present invention.

U.S. Pat. No. 5,557,678, entitled "SYSTEM AND METHOD FOR CENTRALIZED SESSION KEY DISTRIBUTION, PRIVACY ENHANCED MESSAGING AND INFORMATION DISTRIBUTION USING A SPLIT PRIVATE KEY PUBLIC CRYPTOSYSTEM," discloses a variant of the first variety of key escrow scheme listed above. That is, U.S. Pat. No. 5,557,678 distributes an encrypted version of the session key to authorized third parties. The present invention is not of the first variety key escrow scheme listed above. U.S. Pat. No. 5,557,678 is hereby incorporated by reference into the specification of the present invention.

SUMMARY OF THE INVENTION

The object of the present invention is a method of public key cryptography that allows an authorized third party access to the key using key escrow.

Another object of the present invention is a method of public key cryptography that allows an authorized third party access to the key using key escrow having multiple levels of access restriction.

Another object of the present invention is a method of public key cryptography that allows an authorized third party access to the key using key escrow restricted in direction of communication.

Another object of the present invention is a method of public key cryptography that allows an authorized third party access to the key using key escrow that does not require the disclosure to an authorized third party of any secret of the users.

Another object of the present invention is a method of public key cryptography that allows an authorized third party access to the key using key escrow for which said access may be obtained from the escrow agents of either party to the communication.

Another object of the present invention is a method of public key cryptography that allows an authorized third party access to the key using key escrow without requiring that additional data be transmitted beyond that required by the communicating parties.

Another object of the present invention is a method of public key cryptography that allows an authorized third party access to the key using key escrow that enables storage of encrypted data under a key which may be recovered on user request by a predetermined data recovery center and may also be recovered by an authorized third party.

The objects of the present invention are realized in a method of generating a key for secure communication between two users while allowing access to the key and, therefore, the communication by an authorized third party, where access may be obtained via the escrow agents of either user. In the present invention, no secrets of a user are revealed to the third party, and access to the key is restricted by multiple levels of policy-definable access restriction and by the direction of the communication. Additional data need not be transmitted beyond that required by the users to communicate securely. Moreover, the present invention enables storage of encrypted data under a key which may be recovered on user request by a predetermined data recovery center and may also be recovered by an authorized third party.

In the present invention, each user and escrow agent has a public key pair for digitally signing messages, where each public key pair consists of a public signature key and a corresponding secret signature key. In the preferred embodiment, each user has two escrow agents. A digitally signed message includes the message itself, a unique identifier for the signer, and a publicly-known function of the message and the signer's secret signature key. Such a signed message may be verified, or authenticated, using publicly-available certificates that are themselves signed messages that include the certifier's identifier and public signature key.

Each user generates two public key pairs for encrypting messages, where each pair consists of a public encryption key and a corresponding secret encryption key. In the preferred embodiment, each user securely transmits one of its secret encryption keys to one of its escrow agents and securely transmits its other secret encryption key to its other escrow agent. Each escrow agent forms the public encryption key corresponding to the secret encryption key received and transmits a signed message including the user's identifier and public encryption key to a certifying authority. The certifying authority separately confirms the user's identity, signs a combined message formed from the two messages sent to it by the user's escrow agents, and publishes this encryption key certificate in a public directory.

If a first user (User A) wishes to securely send a signed message to a second user (User B), User A first forms a session key $key_{AB}$ by combining, via a known hash function and publicly available information on User B, User B's public encryption key, User A's secret encryption key, the identifiers of the two users, a number of access restrictions, and a random number. In the preferred embodiment, two nested access restrictions are used (i.e., month&year and day). In the preferred embodiment, $key_{AB}$ is as follows:

$key_{AB} = h(h(h(P1_B \wedge S1_A \mod p, ID_A, ID_B, month\&year), day)$
$\quad$ XOR $h(h(P2_B \wedge S2_A \mod p, ID_A, ID_B, month\&year), day),$
$\quad$ random$),$ where XOR represents the exclusive-or function. The order in which the user identifiers appear in the key indicates the direction of communication for which the key may be used. If the order of the identifiers is reversed, a different key results. Therefore, the ability to form $key_{AB}$ only gives access to the communications from User A to User B on the given day in the given month and year. Note that no additional communication, either via handshake or appended LEAF, is required for users to communicate securely within the framework of the present invention. The nature of the Diffie-Hellman key exchange is such that upon receipt of a signed message from User A (which includes the encrypted message and appended thereto $ID_A$, month&year, day, and random used to generate $key_{AB}$), User B can also form $key_{AB}$.

If a third party wishes to gain access to secure communications from User A to User B for a specific period of time, the third party must first request and be granted such authorization. Such an authorization must come from an appropriate authority for the circumstances (e.g., company official, court order, etc.). With proper authorization, the third party may receive datums from the escrow agents of either User A or User B. The datums depend on the granularity of access restriction to which the third party is granted access. For example, the third party may be granted access to secure communications from User A to User B for the month of January 1997. Therefore, the third party will be given the datums $h(P1_B \wedge S1_A \mod p, ID_A, ID_B,$ January 1997) and $h(P2_B \wedge S2_A \mod p, ID_A, ID_B,$ January 1997) by either the escrow agents of User A or the escrow agents of User B. Note that in this example, the third party was granted access to communication from User A to User B for the entire month of January 1997. Therefore, the third party may reconstruct $key_{AB}$ for any other day of this month in order to recover secure communications sent from User A to User B in this period. To recover a secure communication from User A to User B on a given day, the third party must intercept that communication, record the day the message was sent, recover random appended to the encrypted message, and uses this information along with the two datums to recover the message.

The multiple access restrictions enable the present invention to accommodate greater restriction if necessary. For example, if the third party was only granted access to secure communications from User A to User B sent on Jan. 17, 1997, then the third party would be given the following two datums:

$h(h(P1_B \wedge S1_A \mod p, ID_A, ID_B,$ January 1997),17); and
$h(h(P2_B \wedge S2_A \mod p, ID_A, ID_B,$ January 1997),17).

The third party may then recover $key_{AB}$ in the manner outlined above only for Jan. 17, 1997. Note that a user's complete secret encryption key is not in the possession of anyone other than the user.

The present invention also facilitates the recovery of a user's data that is stored in encrypted form by the user in case the user loses its encryption secrets and, therefore, the ability to decrypt the data and by an authorized third party for the same reasons that an authorized third party wishes to gain access to the secure communications of a user. This is accomplished through a data recovery center. The data recovery center is nearly indistinguishable from the user who received the encrypted message above. The user who wishes to store encrypted data using the present invention performs the steps outlined above as if the user were going to send the encrypted data to another user (i.e., the data recovery center). Instead of sending the encrypted data, the user stores it with header information that identifies the user, the data recovery center, the access restrictions (e.g., month&year, day), and the random number. If the user loses its encryption secrets, it may send the header information to the data recovery center which may use this information to recover the key used to encrypt the data. As above, a third party may gain access to the encrypted communications between the user and the data recovery center (i.e., encrypted data and the corresponding header information) by first seeking authorization for a particular set of access restrictions that include the restrictions under which the data was encrypted. With authorization, the third party may then be given, from the escrow agents of either the user or the data recovery center, the datums necessary for reconstructing the key used to encrypt the data. As above, a user's encryption secrets are not revealed to anyone. Note that a compromise of the data recovery center does not compromise the stored encrypted data unless the user is unable to physically protect the stored encrypted data. The data recovery center may be another user or the user itself. The present invention may also be used to perform key recovery instead of data recovery by encrypting a key instead of encrypting data.

DETAILED DESCRIPTION

Figure 1:
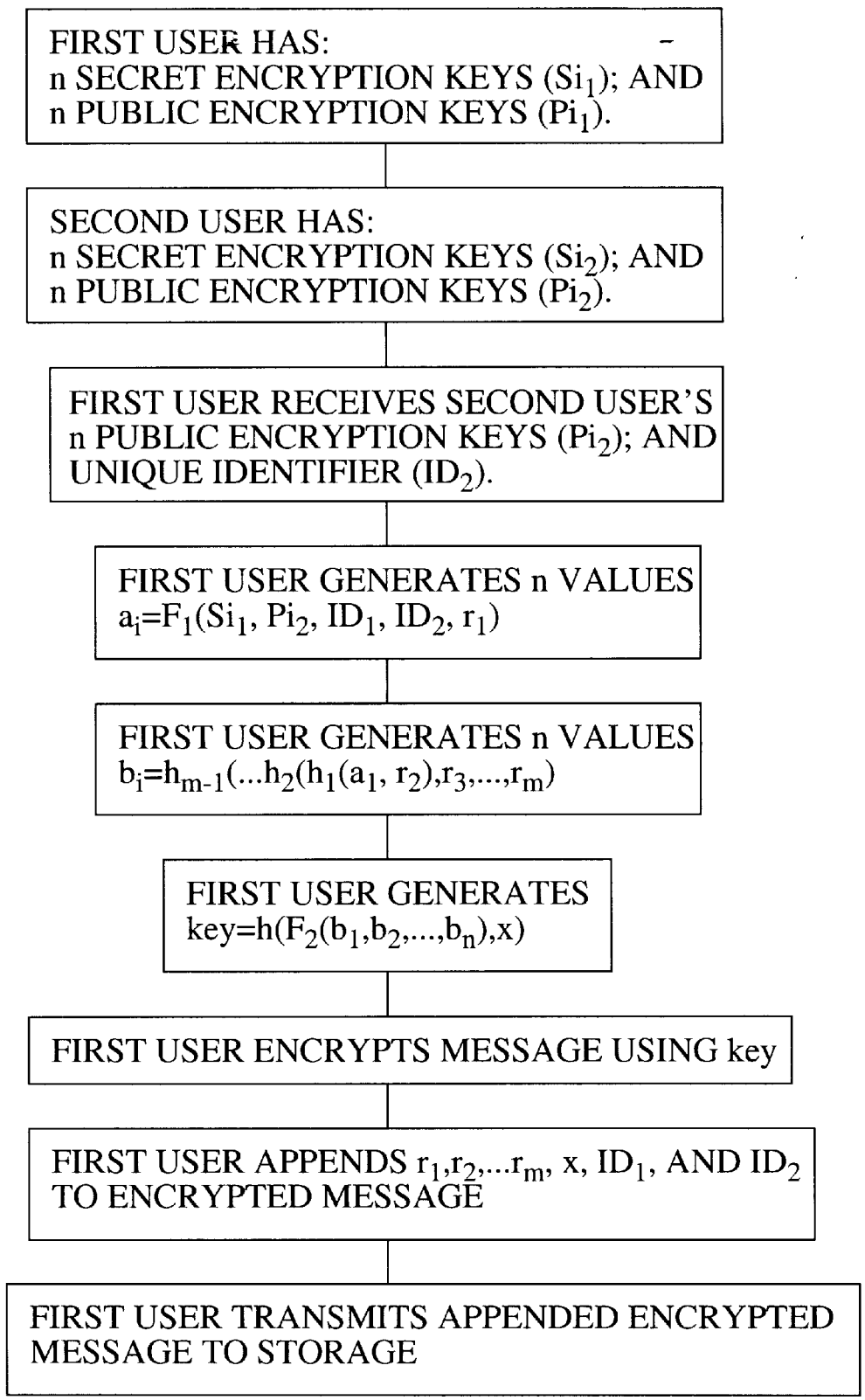
FIG. 1 is a flow chart of how a first user stores encrypted data in a manner that includes key escrow.

FIG. 1 illustrates a method of encryption that includes key escrow. Each user of the system has n secret encryption keys, where n is a positive integer, and where $Si_1$ denotes the $i^{th}$ secret encryption key. Also, each user has n public encryption keys corresponding to the n secret encryption keys, where $Pi_1$ denotes the $i^{th}$ public encryption key.

A first user who wishes to encrypt a message, or data, using the present invention must first receive n public encryption keys of a second user and a unique identifier $ID_2$ of the second user. Next, the first user generates n values $a_i = F_1(Si_1, Pi_2, ID_2, r_1)$. $F_1$ is a function whose properties guarantee that $F_1(Si_2, Pi_1, ID_1, ID_2, r_1) = a_i$, and that $F_1(Si_1, Pi_2, ID_2, ID_1, r_1)$ is not feasibly computable from $a_i$. This feature enables the present invention to restrict access to communications between the first user and the second user to a particular direction of such communications. In the preferred embodiment, the order of elements $ID_1$ and $ID_2$ will indicate the direction of communication. $ID_1$ is a unique identifier of the first user. $r_1$ is a first of m access restriction values $r_1, r_2, \ldots, r_m$, where m is a positive integer. For example, access may be restricted by time, group affiliation, corporate affiliation, cell-phone architecture, and so on. The access restrictions may be nested (e.g., year, month, day, etc.) or not (e.g., day, corporate organization, etc.) and multi-tiered or not.

Next, the first user generates n values $b_i = h_{m-1}(\ldots h_2(h_1(a_i, r_2), r_3), \ldots, r_m)$, where $h_1, h_2, \ldots, h_{m-1}$ are one-way hash functions. The hash functions may be different from each other or they may be identical to each other. An example of a secure one-way hash function is the Secure Hash Algorithm (SHA) proposed in National Institute of Standards and Technology, NIST FIPS PUB 180, "Secure Hash Standard," U.S. Department of Commerce, May 1993.

Next, the first user generates key=$h(F_2(b_1, b_2, \ldots, b_n), x)$. $F_2$ is a combining function, preferably the exclusive-or function. h is a one-way hash function that may be the same as or different from $h_1, h_2, \ldots, h_{m-1}$. x is a random number.

Next, the first user encrypts the message using key. The encryption algorithm may be any secure encryption algorithm, preferably a symmetric encryption algorithm E that has a corresponding decryption function D. An example of such an algorithm is the Digital Encryption Standard (DES) proposed in National Bureau of Standards, NBS FIPS PUB 46, "Data Encryption Standard," U.S. Dept. of Commerce, January 1977.

Next, the first user appends $r_1, r_2, \ldots, r_m$, x, $ID_1$, and $ID_2$ to the encrypted message and transmits it to a storage medium. The storage medium may be of the first user or of another user. Note that only information necessary for secure communication between the first user and the second user need be sent in order to allow an authorized third party access to the communication. Note that additional information for the sole purpose of allowing third party access need not be sent. Many other key escrow schemes require some additional information be sent for the sole purpose of enabling third party access.

In an alternate embodiment, key may be used as a key encryption key rather than an encryption key. That is, a second key ($key_2$) may be generated and used to encrypt the message. key would then be used to encrypt $key_2$. The encrypted $key_2$ and the encrypted message would then be stored along with the appended information, as described above.

In the preferred embodiment, the message is digitally signed by the first user before being encrypted.

Figure 2:
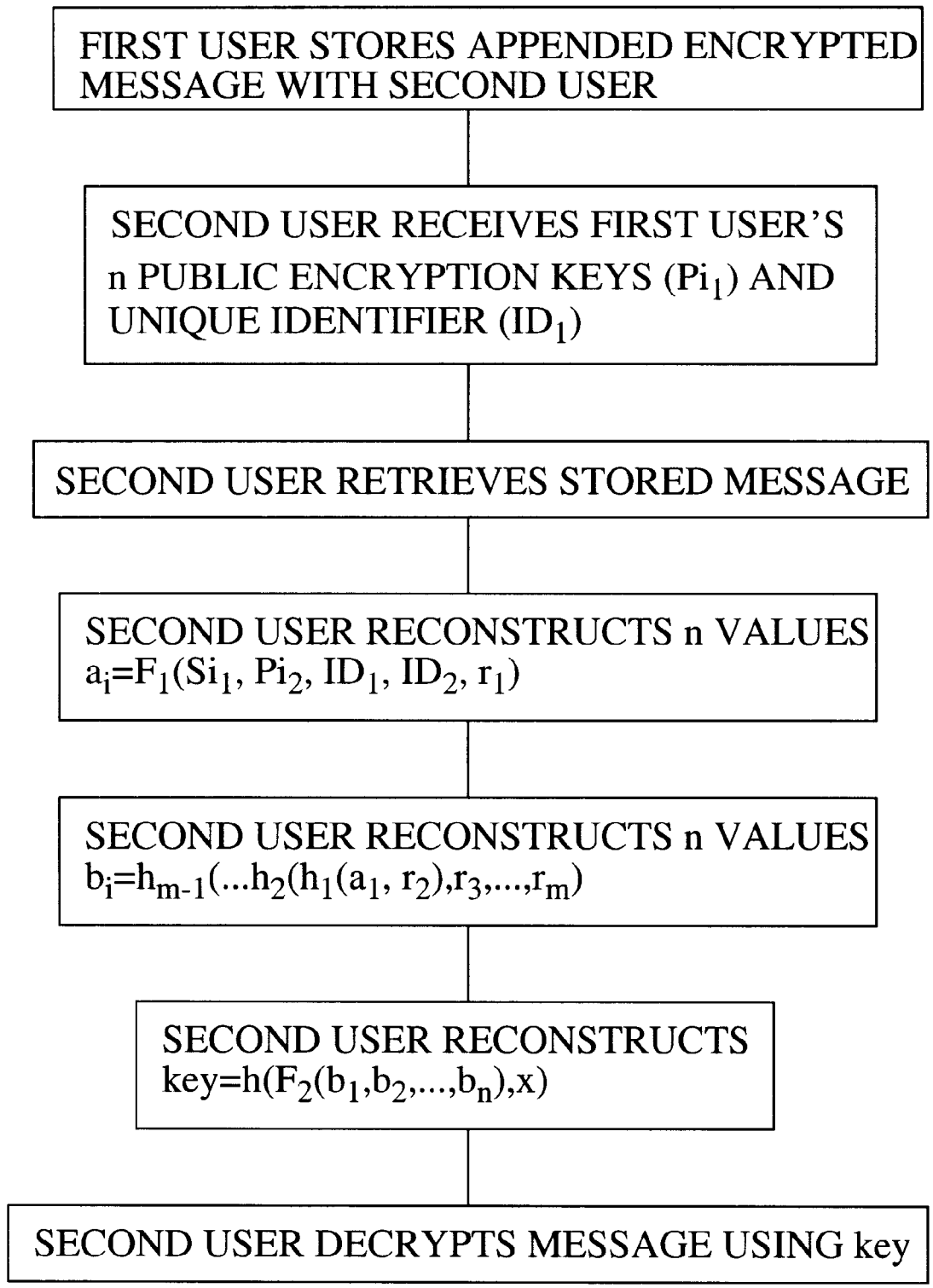
FIG. 2 is a flow chart of how a second user reads encrypted data.

FIG. 2 illustrates the steps performed by a second user when the storage medium to which the encrypted data is transmitted is that of the second user. The second user recovers the message by first receiving n public encryption keys of the first user and a unique identifier $ID_1$ of the first user.

Next, the second user retrieves the encrypted message stored in its storage medium and uses the information appended thereto in reconstructing n values $a_i = F_1(Si_2, Pi_1, ID_1, ID_2, r_1)$ and n values $b_i = h_{m-1}(\ldots h_2(h_1(a_i, r_2), r_3), \ldots, r_m)$. Next, the second user reconstructs key=$h(F_2(b_1, b_2, \ldots, b_n), x)$. With key, the second user may decrypt the message.

Figure 3:
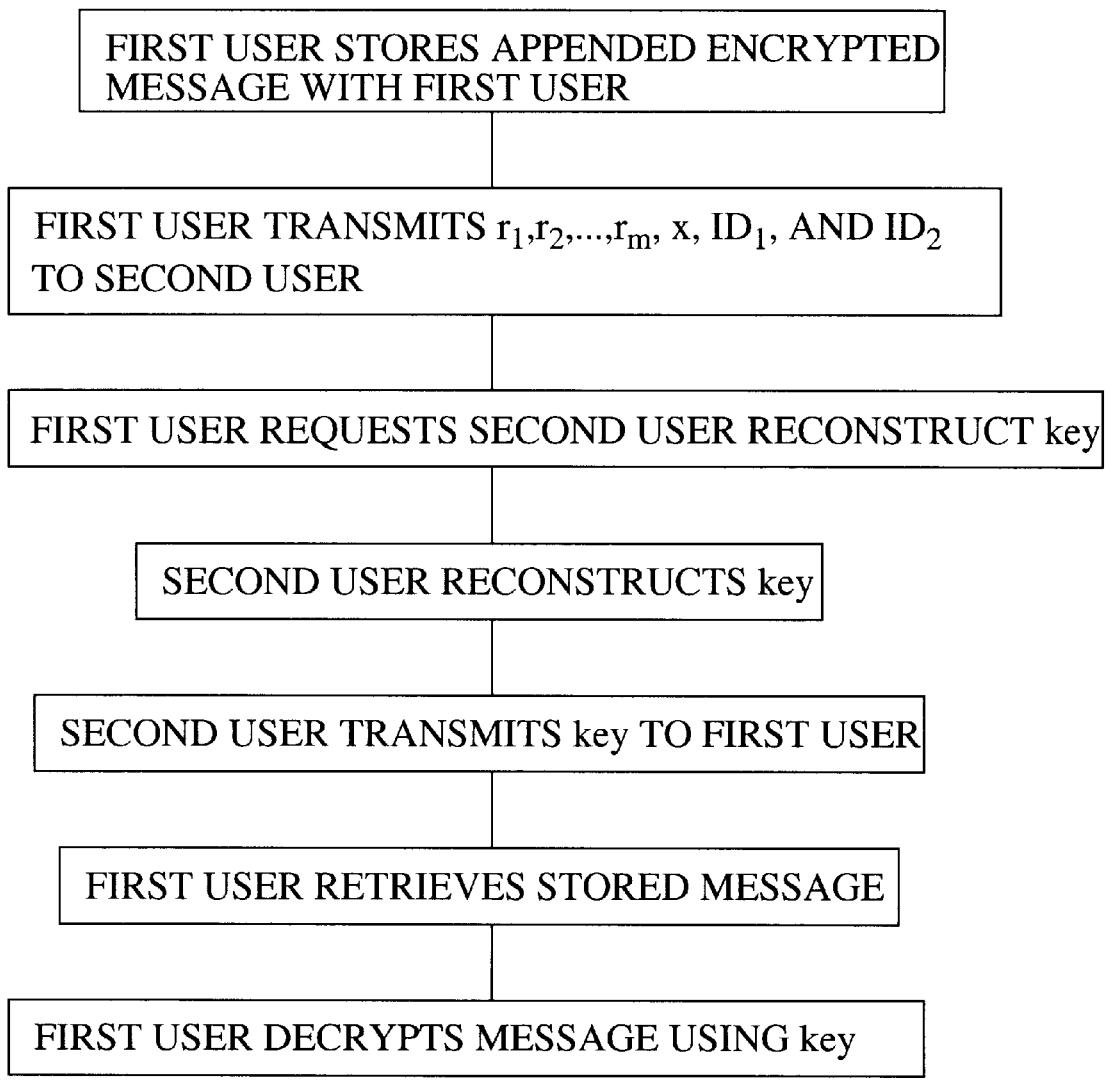
FIG. 3 is a flow chart of how the first user recovers encrypted data.

FIG. 3 illustrates the steps performed by the first user when the storage medium to which the encrypted message is sent is that of the first user. Here, the present invention is used for data encryption with a data recovery capability. That is, the first user may recover the message, or data, in the event that the first user loses the ability to generate key. First, the first user transmits $r_1, r_2, \ldots, r_m$, x, $ID_1$, and $ID_2$ to the second user and asks the second user to use these values to reconstruct key. After reconstructing key, the second user transmits it securely to the first user. The second user is able to reconstruct key because it was originally constructed with the second user's public encryption key and unique identifier. With key, the first user may recover the message. An authorized third party that is able to gain physical access to the storage medium of the first user may also do the same.

Figure 4:
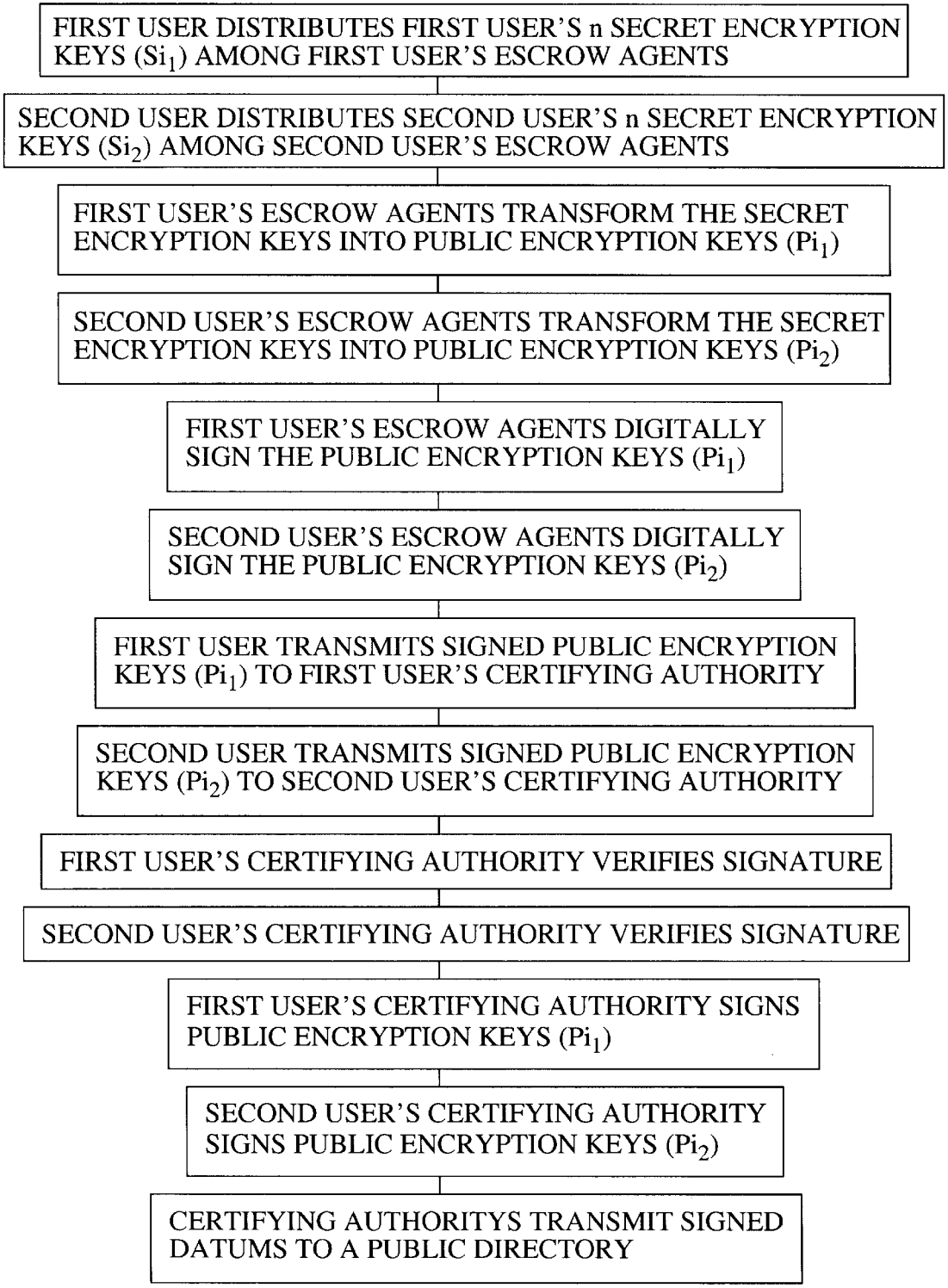
FIG. 4 is a flow chart of how a user enrolls in the method of the present invention.

FIG. 4 illustrates the steps that each user must perform in order to enroll in the key escrow scheme of the present invention.

First, each user distributes its n secret encryption keys among its escrow agents. Each user may have one or more, preferably two, escrow agents. The distribution may be conducted securely by using an authenticated Diffie-Hellman-type key-exchange method.

Next, each escrow agent transforms the secret encryption keys that they received into the corresponding public encryption keys. Next, each escrow agent appends the unique identifier of the user-owner of the public encryption key to the public encryption key, digitally signs the combination, and transmits the signed combination to a certifying authority of the user.

The certifying authority collects all of the signed messages that it receives, verifies the signatures, digitally signs the collection, and publishes it on a public directory as the public key certificate of the corresponding user. Thus, the presence of such a certificate on the directory guarantees that the user has properly escrowed its encryption secrets.

An enrolled first user who wishes to use the present invention to communicate securely with an enrolled second user first retrieves the public certificate of the second user from the public directory and verifies the signature of the second user's certifying authority. The first user uses the second user's public encryption key and unique identifier to construct key and transmit an encrypted message to the storage medium of the second user as described above. Again, key may be used as either an encryption key or a key encryption key.

Upon receiving an encrypted message from the first user, the second user retrieves the public key certificate of the first user from the public directory. After verifying the signatures in the certificate, the second user reconstructs key as described above and uses it to recover the message.

Figure 5:
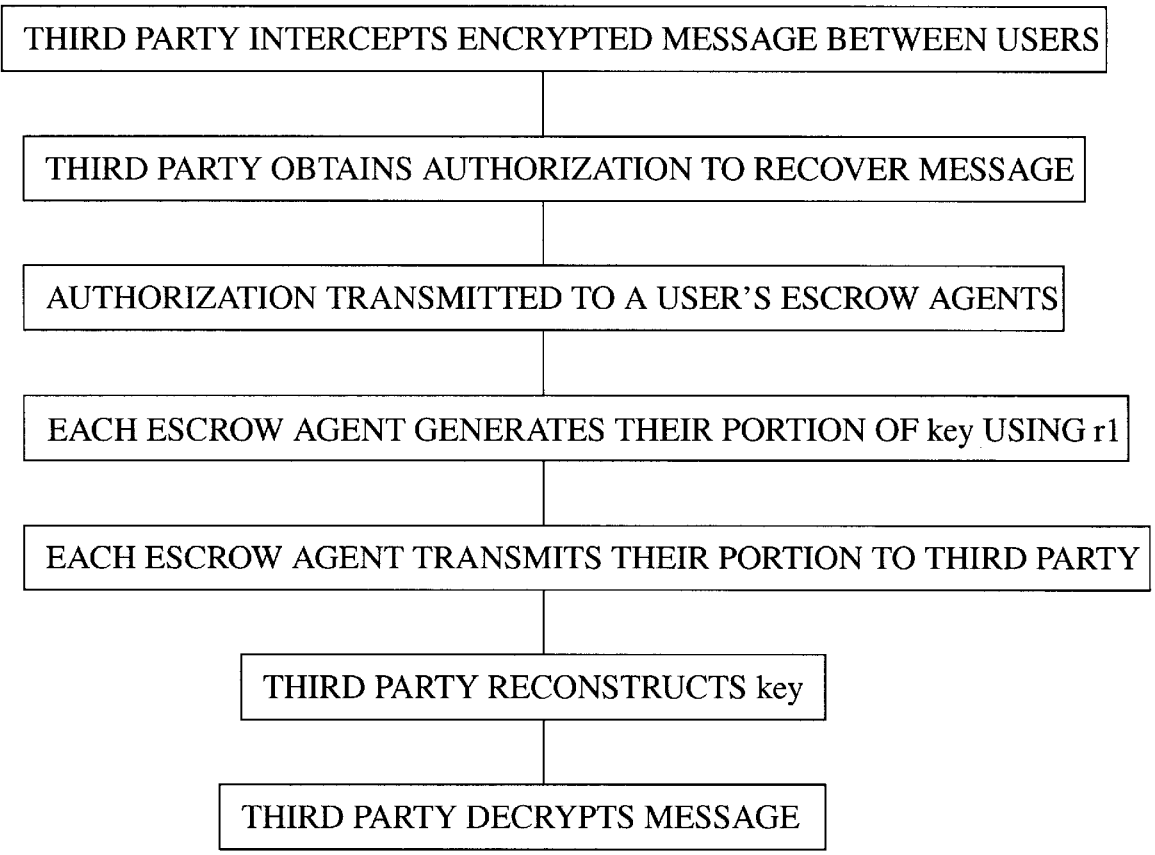
FIG. 5 is a flow chart of how an authorized third party gains access to encrypted data.

FIG. 5 illustrates the steps that a third party must perform in order to gain access to a message securely sent from a first user to a second user of the present invention.

First, the third party must obtain authorization from an appropriate authority. The appropriate authority depends on the particular application of the present invention. For example, corporate authority must be obtained to gain access to corporate records; group authority must be obtained in order to gain access to group records; court authority must be obtained in order to gain access to communications between private citizens; and so on.

The authority would then relay the authorization, if granted, along with k access restrictions $r_1, \ldots, r_k$ to each of the escrow agents of one of the users. For example, if $r_1$ represents a particular month and year, and $r_2$ denotes a day, then the authority can grant access to communications on a particular date, or for a particular month.

Next, each escrow agent contacted by the authority generates a portion of key that depends upon the access restriction values received and the secret encryption key of the user for which the escrow agent is employed. Specifically, if the escrow agent holds the user's $i^{th}$ secret encryption key, the escrow agent forms $h_{k-1}(\ldots h_2(h_1(a_i,r_2),r_3),\ldots,r_k)$.

Next, each escrow agent transmits securely to the third party the portion of key it generated and the sequence $r_1,\ldots,r_k$. After receiving each portion of key from the escrow agents, and obtaining a message encrypted using key, the third party may reconstruct key and use it to decrypt the message. Note that no secret encryption keys of either user are revealed to the third party. With the access restriction scheme of the present invention, a third party may gain access to the communications of a user for a restricted period, or situation, only. The user of the present invention does not have to change its secret encryption keys after this period, or situation, is over in order to prevent continued access to the user's communications by the third party. Many other key escrow methods require the user to change its secret encryption key after a third party has been granted access to the user's communications.

Here is a detailed example of the preferred embodiment of the present invention. A first user has two secret encryption keys ($S1_1$ and $S2_1$) and two public encryption keys ($P1_1 = g \wedge S1_1$ mod p and $P2_1 = g \wedge S2_1$ mod p, where g is a base, where "$\wedge$" denotes exponentiation, and where p is a prime number). A second user has two secret encryption keys ($S1_2$ and $S2_2$) and two public encryption keys ($P1_2 = g \wedge S1_2$ mod p and $P2_2 = g \wedge S2_2$ mod p). The first user receives $P1_2$ and $P2_2$ and generates $a_1 = h(P1_2 \wedge S1_1$ mod p, $ID_1$, $ID_2$, $r_1$), $a_2 = h(P2_2 \wedge S2_1$ mod p, $ID_1$, $ID_2$, $r_1$), $b_1 = h(a_1, r_2)$, $b_2 = h(a_2, r_2)$, and key=$h((b_1$ XOR $b_2),x)$, where $r_1$ is the year and month, $r_2$ is the day of the month, and x is a random number. The first user encrypts a digitally signed message using key and appends $r_1$, $r_2$, x, $ID_1$, and $ID_2$ to it. The first user then transmits the result to either the storage medium of the second user (for secure communications) or the storage medium of the first user (for data encryption with a data recovery capability). Before describing the specifics for both of these methods, the specifics for enrollment will be discussed.

The first user transmits $S1_1$ to a first escrow agent of the first user by generating a secret key $t1_1$; generating $tp1_1 = g \wedge t1_1$ mod p; receiving $p_{EA11} = g \wedge S_{EA11}$ mod p from the first user's first escrow agent; generating $k1_1 = p_{EA11} \wedge t1_1$ mod p; encrypting $S1_1$ using $k1_1$ as the key; receiving a unique identifier $ID_{CA1}$ from a certifying authority; digitally signing $tp1_1$, $E_{k11}(S1_1)$, and $ID_{CA1}$; and sending the result to the first escrow agent.

The first user transmits $S2_1$ to a second escrow agent of the first user by: generating a secret key $t2_1$; generating $tp2_1 = g \wedge t2_1$ mod p; receiving $p_{EA21} = g \wedge S_{EA21}$ mod p from the first user's second escrow agent; generating $k2_1 = p_{EA21} \wedge t2_1$ mod p; encrypting $S2_1$ using $k2_1$ as the key; digitally signing $tp2_1$, $E_{k21}(S2_1)$, and $ID_{CA1}$; and sending the result to the second escrow agent.

The second user transmits $S1_2$ to a first escrow agent of the second user by: generating a secret key $t1_2$; generating $tp1_2 = g \wedge t1_2$ mod p; receiving $p_{EA12} = g \wedge S_{EA12}$ mod p from the second user's first escrow agent; generating $k1_2 = p_{EA12} \wedge t1_2$ mod p; encrypting $S1_2$ using $k1_2$ as the key; receiving a unique identifier $ID_{CA2}$ from a certifying authority; digitally signing $tp1_2$, $E_{k12}(S1_2)$, and $ID_{CA2}$; and sending the result to the first escrow agent of the second user.

The second user transmits $S2_2$ to a second escrow agent of the second user by: generating a secret key $t2_2$; generating $tp2_2 = g \wedge t2_2$ mod p; receiving $p_{EA22} = g \wedge S_{EA22}$ mod p from the second user's second escrow agent; generating $k2_2 = p_{EA22} \wedge t2_2$ mod p; encrypting $S2_2$ using $k2_2$ as the key; digitally signing $tp2_2$, $E_{k22}(S2_2)$, and $ID_{CA2}$; and sending the result to the second escrow agent.

The first escrow agent of the first user authenticates the first user's digital signature; generates $tp1_1 \wedge S_{EA11}$ mod p, where $S_{EA11}$ is a secret encryption key of the first escrow agent of the first user, and where $tp1_1 \wedge S_{EA11}$ mod p is equal to $k1_1$; decrypts $E_{k11}(S1_1)$ using $tp1_1 \wedge S_{EA11}$ mod p to recover $S1_1$; generates $p1_1 = g \wedge S1_1$ mod p; digitally signs $p1_1$ and $ID_1$; and sends the result to the first user's certifying authority.

The second escrow agent of the first user authenticates the first user's digital signature; generates $tp2_1 \wedge S_{EA21}$ mod p, where $S_{EA21}$ is a secret encryption key of the second escrow agent of the first user, and where $tp2_1 \wedge S_{EA21}$ mod p is equal to $k2_1$; decrypts $E_{k21}(S2_1)$ using $tp2_1 \wedge S_{EA21}$ mod p to recover $S2_1$; generates $p2_1 = g \wedge S2_1$ mod p; digitally signs $p2_1$ and $ID_1$; and sends the result to the first user's certifying authority.

The first escrow agent of the second user authenticates the second user's digital signature; generates $tp1_2 \wedge S_{EA12}$ mod p, where $S_{EA12}$ is a secret encryption key of the first escrow agent of the second user, and where $tp1_2 \wedge S_{EA12}$ mod p is equal to $k1_2$; decrypts $E_{k12}(S1_2)$ using $tp1_2 \wedge S_{EA12}$ mod p to recover $S1_2$; generates $p1_2 = g \wedge S1_2$ mod p; digitally signs $p1_2$ and $ID_2$; and sends the result to the second user's certifying authority.

The second escrow agent of the second user authenticates the second user's digital signature; generates $tp2_2 \wedge S_{EA22}$ mod p, where $S_{EA22}$ is a secret encryption key of the second escrow agent of the second user, and where $tp2_2 \wedge S_{EA22}$ mod p is equal to $k2_2$; decrypts $E_{k22}(S2_2)$ using $tp2_2 \wedge S_{EA22}$ mod p to recover $S2_2$; generates $p2_2 = g \wedge S2_2$ mod p; digitally signs $p2_2$ and $ID_2$; and sends the result to the second user's certifying authority.

The first user's certifying authority verifies the digital signature of the first escrow agent of the first user; verifies the digital signature of the second escrow agent of the first user; digitally signs the digitally signed message received from the first escrow agent of the first user, the digitally signed message of the second escrow agent of the first user, $ID_1$, and possibly other fields (e.g., a time stamp, expiration date); and sends the result to a public directory as the public key certificate of the first user.

The second user's certifying authority verifies the digital signature of the first escrow agent of the second user; verifies the digital signature of the second escrow agent of the second user; digitally signs the digitally signed message received from the first escrow agent of the second user, the digitally signed message of the second escrow agent of the second user, $ID_2$, and possibly other fields; and sends the result to the public directory as the public key certificate of the second user.

If the first user transmits an encrypted signed message with $r_1$, $r_2$, x, $ID_1$, and $ID_2$ to the storage medium of the second user then the second user must perform the following steps to decrypt the message: retrieve the stored message from the storage medium of the second user; retrieve the public key certificate of the first user from the public directory; verify the signatures in the certificate; reconstruct $a_1=h(P1_1 \wedge S1_2 \bmod p, ID_1, ID_2, r_1)$, $a_2=h(P2_1 \wedge S2_2 \bmod p, ID_1, ID_2, r_1)$, $b_1=h(a_1,r_2)$, $b_2=h(a_2,r_2)$, and key=$h((b_1 \text{ XOR } b_2),x)$; decrypt the encrypted message using key; and verify the first user's digital signature on the message.

A third party may gain access to the communication above by first obtaining authorization from an appropriate authority to gain access to secure communications from the first user to the second user restricted by $r_1$. The appropriate authority then digitally signs $ID_1$, $ID_2$, and $r_1$ and sends the signed message to the first and second escrow agents of either user. The first escrow agent of one of the users then generates $a_1=h(P1_2 \wedge S1_1 \bmod p, ID_1, ID_2, r_1)=h(P1_1 \wedge S1_2 \bmod p, ID_1, ID_2, r_1)$, digitally signs $a_1$, $ID_1$, and $ID_2$, and sends this signed message to the third party. The second escrow agent of the same user as above generates $a_2=h(P2_2 \wedge S2_1 \bmod p, ID_1, ID_2, r_1)=h(P2_1 \wedge S2_2 \bmod p, ID_1, ID_2, r_1)$; digitally signs $a_2$, $ID_1$, and $ID_2$; and sends this signed message to the third party. Knowing $r_2$ from the intercepted communication, the third party reconstructs $b_1=h(a_1,r_2)$, $b_2=h(a_2,r_2)$, and key=$h((b_1 \text{ XOR } b_2),x)$. The third party uses key to decrypt the digitally signed message. The third party then verifies the signature.

If the encrypted message (with $r_1$, $r_2$, x, $ID_1$, and $ID_2$) is stored with the first user, the first user may recover the message if the first user loses the ability to do so itself by: transmitting $r_1$, $r_2$, x, $ID_1$, and $ID_2$ to the second user; requesting the second user to reconstruct key; receiving the reconstructed key from the second user; retrieving the encrypted message from the storage medium of the first user; and decrypting the encrypted message using key.

What is claimed is:

1. A method of encryption that includes key escrow, comprising the steps of:

a) having, by a first user, n secret encryption keys, where n is a positive integer, and where $Si_1$ denotes the $i^{th}$ secret encryption key of the first user;

b) having, by the first user, n public encryption keys corresponding to the n secret encryption keys of the first user, where $Pi_1$ denotes the $i^{th}$ public encryption key of the first user;

c) having, by a second user, n secret encryption keys, where $Si_2$ denotes the $i^{th}$ secret encryption key of the second user;

d) having, by the second user, n public encryption keys corresponding to the n secret encryption keys of the second user, where $Pi_2$ denotes the $i^{th}$ public encryption key of the second user;

e) receiving, by the first user, the n public encryption keys of the second user;

f) receiving, by the first user, a unique identifier $ID_2$ of the second user;

g) generating, by the first user, n values $a_i=F_1(Si_1, Pi_2, ID_1, ID_2, r_1)$, where $a_i=F_1(Si_2, Pi_1, ID_1, ID_2, r_1)$, where $a_i$ does not equal $F_1(Si_1, Pi_2, ID_2, ID_1, r_1)$, where $F_1$ is a first function, where $ID_1$ is a unique identifier of the first user, where $r_1$ is a first of m access restriction values $r_1, r_2, \ldots, r_m$, and where m is a positive integer;

h) generating, by the first user, n values $b_i=h_{m-1}(\ldots h_2(h_1(a_1,r_2),r_3), \ldots, r_m)$, where $h_1, h_2, \ldots, h_{m-1}$ are one-way hash functions;

i) generating, by the first user, key=$h(F_2(b_1, b_2, \ldots, b_n),x)$, where $F_2$ is a second function, where h is a one-way hash function, and where x is a random number;

j) encrypting, by the first user, a message using key;

k) appending, by the first user, $r_1, r_2, \ldots, r_m$, x, $ID_1$, and $ID_2$ to the encrypted message; and l) transmitting, by the first user, the result of step (k) to a storage medium.

2. The method of claim 1, wherein the step of transmitting the result of step (k) to a storage medium is comprised of transmitting the result of step (k) to a storage medium of the second user.

3. The method of claim 2, further comprising the steps of:

a) retrieving, by the second user, the result of step (k) stored in the storage medium of the second user;

b) receiving, by the second user, a unique identifier $ID_1$ of the first user;

c) receiving, by the second user, the n public encryption keys of the first user;

d) reconstructing, by the second user, the n values $a_i=F_1(Si_2, Pi_1, ID_2, r_1)$;

e) reconstructing, by the second user, the n values $b_i=h_{m-1}(\ldots h_2(h_1(a_1,r_2),r_3), \ldots, r_m)$;

f) reconstructing, by the second user, key=$h(F_2(b_1, b_2, \ldots, b_n),x)$; and g) decrypting, by the second user, the encrypted message using key.

4. The method of claim 1, wherein the step of transmitting the result of step (k) to a storage medium is comprised of transmitting the result of step (k) to a storage medium of the first user.

5. The method of claim 4, further comprising the steps of:

a) retrieving, by the first user, the result of step (k) stored in the storage medium of the first user;

b) reconstructing, by the first user, key; and c) decrypting, by the first user, the encrypted message using key.

6. The method of claim 4, further comprising the steps of:

a) transmitting, by the first user, $r_1, r_2, \ldots, r_m$, x, $ID_1$, and $ID_2$ to the second user;

b) requesting, by the first user, that the second user reconstruct key;

c) reconstructing key by the second user;

d) transmitting, by the second user, key to the first user;

e) retrieving, by the first user, the encrypted message from the storage medium of the first user; and f) decrypting, by the first user, the encrypted message using key.

7. The method of claim 1, wherein the step of encrypting, by the first user, a message using key is comprised of encrypting, by the first user, a message using key, where the message is a second key $key_2$.

8. The method of claim 6, further comprising the steps of:

a) encrypting, by the first user, a second message using $key_2$;

b) storing, by the first user, the result of step (a) in the storage medium of the first user;

c) retrieving, by the first user, the result of step (b) from the storage medium of the first user;

d) reconstructing, by the first user, key;

e) retrieving, by the first user, the encrypted $key_2$ from the storage medium of the first user;

f) decrypting, by the first user, the encrypted $key_2$ using key;

g) retrieving, by the first user, the encrypted second message from the storage medium of the first user; and h) decrypting, by the first user, the encrypted second message using $key_2$.

9. The method of claim 7, further comprising the steps of:
a) encrypting, by the first user, a second message using key$_2$;
b) storing, by the first user, the result of step (a) in the storage medium of the first user;
c) transmitting, by the first user, r$_1$,r$_2$, . . . ,r$_m$, x, ID$_1$, and ID$_2$ to the second user;
d) requesting, by the first user, the second user reconstruct key;
e) reconstructing key by the second user;
f) transmitting, by the second user, key to the first user;
g) retrieving, by the first user, the encrypted key$_2$ from the storage medium of the first user;
h) decrypting, by the first user, the encrypted key$_2$ using key;
i) retrieving, by the first user, the encrypted second message from the storage medium of the first user; and
j) decrypting, by the first user, the encrypted second message using key$_2$.

10. The method of claim 1, further comprising the steps of:
a) distributing, by the first user, the n secret encryption keys of the first user among at least one escrow agent of the first user; and
b) distributing, by the second user, the n secret encryption keys of the second user among at least one escrow agent of the second user.

11. The method of claim 10, further comprising the steps of:
a) transforming, by at least one escrow agent of the first user, at least one of the n secret encryption keys of the first user into at least one corresponding public encryption key of the first user;
b) signing digitally, by at least one escrow agent of the first user, the result of step (a);
c) sending, by at least one escrow agent of the first user, the result of step (b) to a certifying authority of the first user;
d) transforming, by at least one escrow agent of the second user, at least one of the n secret encryption keys of the second user into at least one corresponding public encryption key of the second user;
e) signing digitally, by at least one escrow agent of the second user, the result of step (d); and
f) sending, by at least one escrow agent of the second user, the result of step (e) to a certifying authority of the second user.

12. The method of claim 11, further comprising the steps of:
a) verifying, by the certifying authority of the first user, the digital signature of at least one escrow agent of the first user;
b) signing digitally, by the certifying authority of the first user, at least one public encryption key of the first user;
c) sending, by the certifying authority of the first user, the result of step (b) to a public directory;
d) verifying, by the certifying authority of the second user, the digital signature of at least one escrow agent of the second user;
e) signing digitally, by the certifying authority of the second user, at least one public encryption key of the second user; and
f) sending, by the certifying authority of the second user, the result of step (e) to the public directory.

13. The method of claim 12, wherein the step of transmitting the result of step (k) to a storage medium is comprised of transmitting the result of step (k) to a storage medium of the second user.

14. The method of claim 13, further comprising the steps of:
a) retrieving, by the second user, the result of step (k) stored in the storage medium of the second user;
b) receiving, by the second user, a unique identifier ID$_1$, of the first user;
c) receiving, by the second user, the n public encryption keys of the first user;
d) reconstructing, by the second user, the n values $a_i = F_1(Si_2, Pi_1, ID_1, ID_2, r_1)$;
e) reconstructing, by the second user, the n values $b_i = h_{m-1}( \ldots h_2(h_1(a_1,r_2),r_3), \ldots ,r_m)$;
f) reconstructing key=$h(F_2(b_1, b_2, \ldots ,b_n),x)$; and
g) decrypting, by the second user, the encrypted message using key.

15. The method of claim 13, further comprising the steps of:
a) obtaining authorization, by a third party, from an appropriate authority to gain access to secure communications from the first user to the second user restricted by at least one of the access restriction values r$_1$,r$_2$, . . . ,r$_k$, where k is a positive integer;
b) relaying the authorization, by the appropriate authority to each of the escrow agents of the first user;
c) generating, by each of the escrow agents of the first user, a portion of key that depends upon the first user's secret encryption key held by the escrow agent generating the portion of key and the access restriction values included in the authorization, where the portion of key depending on the $i^{th}$ secret encryption key of the first user is $h_{k-1}( \ldots h_2(h_1(a_i, r_2), r_3), \ldots ,r_k)$;
d) transmitting securely, by each escrow agent of the first user, the portion of key generated and the at least one access restriction values in sequence to the third party;
e) obtaining, by the third party, the transmission from the first user to the second user;
f) reconstructing, by the third party, key using the portions of key received and the access restriction values and random number obtained; and
g) decrypting the message sent from the first user to the second user that was encrypted with key.

16. The method of claim 13, further comprising the steps of:
a) obtaining authorization, by a third party, from an appropriate authority to gain access to secure communications from the first user to the second user restricted by at least one of the access restriction values r$_1$,r$_2$, . . . ,r$_k$, where k is a positive integer;
b) relaying the authorization, by the appropriate authority to each of the escrow agents of the second user;
c) generating, by each of the escrow agents of the second user, a portion of key that depends upon the second user's secret encryption key held by the escrow agent generating the portion of key and the access restriction values included in the authorization, where the portion of key depending on the $i^{th}$ secret encryption key of the second user is $h_{k-1}( \ldots h_2(h_1(a_i,r_2),r_3), \ldots ,r_k)$;
d) transmitting securely, by each escrow agent of the second user, the portion of key generated and the at least one access restriction values in sequence to the third party;

e) obtaining, by the third party, the transmission from the first user to the second user;

f) reconstructing, by the third party, key using the portions of key received and the access restriction values and random number obtained; and g) decrypting the message sent from the first user to the second user that was encrypted with key.

17. The method of claim 12, wherein the step of transmitting the result of step (k) to a storage medium is comprised of transmitting the result of step (k) to a storage medium of the first user.

18. The method of claim 17, further comprising the steps of:

a) transmitting, by the first user, $r_1, r_2, \ldots, r_m$, x, $ID_1$, and $ID_2$ to the second user;

b) requesting, by the first user, that the second user reconstruct key;

c) reconstructing key by the second user;

d) transmitting, by the second user, key to the first user;

e) retrieving, by the first user, the encrypted message from the storage medium of the first user; and f) decrypting, by the first user, the encrypted message using key.

19. The method of claim 17, further comprising the steps of:

a) obtaining authorization, by a third party, from an appropriate authority to gain access to secure communications from the first user to the second user restricted by at least one of the access restriction values $r_1, r_2, \ldots, r_k$, where k is a positive integer;

b) relaying the authorization, by the appropriate authority to each of the escrow agents of the first user;

c) generating, by each of the escrow agents of the first user, a portion of key that depends upon the first user's secret encryption key held by the escrow agent generating the portion of key and the access restriction values included in the authorization, where the portion of key depending on the $i^{th}$ secret encryption key of the first user is $h_{k-1}(\ldots h_2(h_1(a_i, r_2), r_3), \ldots, r_k)$;

d) transmitting securely, by each escrow agent of the first user, the portion of key generated and the at least one access restriction values in sequence to the third party;

e) obtaining, by the third party, the transmission from the first user to the storage medium of the first user;

f) reconstructing, by the third party, key using the portions of key received and the access restriction values and random number obtained; and g) decrypting the message sent from the first user to the second user that was encrypted with key.

20. The method of claim 17, further comprising the steps of:

a) obtaining authorization, by a third party, from an appropriate authority to gain access to secure communications from the first user to the second user restricted by at least one of the access restriction values $r_1, r_2, \ldots, r_k$, where k is a positive integer;

b) relaying the authorization, by the appropriate authority to each of the escrow agents of the second user;

c) generating, by each of the escrow agents of the second user, a portion of key that depends upon the second user's secret encryption key held by the escrow agent generating the portion of key and the access restriction values included in the authorization, where the portion of key depending on the $i^{th}$ secret encryption key of the second user is $h_{k+1}(\ldots h_2(h_1(a_i, r_2), r_3), \ldots, r_k)$;

d) transmitting securely, by each escrow agent of the second user, the portion of key generated and the at least one access restriction values in sequence to the third party;

e) obtaining, by the third party, the transmission from the first user to the storage medium of the first user;

f) reconstructing, by the third party, key using the portions of key received and the access restriction values and random number obtained; and g) decrypting the message sent from the first user to the second user that was encrypted with key.

21. The method of claim 1, wherein the step of having, by the first user, n secret encryption keys is comprised of the step of having, by the first user, two secret encryption keys $S1_1$ and $S2_1$.

22. The method of claim 21, wherein the step of having, by the first user, n public encryption keys is comprised of the step of having, by the first user, two public encryption keys $P1_1 = g \wedge S1_1 \mod p$ and $P2_1 = g \wedge S2_1 \mod p$, where g is a base, where "$\wedge$" denotes exponentiation, and where p is a prime number.

23. The method of claim 22, wherein the step of having, by the second user, n secret encryption keys is comprised of the step of having, by the second user, two secret encryption keys $S1_2$ and $S2_2$.

24. The method of claim 23, wherein the step of having, by the second user, n public encryption keys is comprised of the step of having, by the second user, two public encryption keys $P1_2 = g \wedge S1_2 \mod p$ and $P2_2 = g \wedge S2_2 \mod p$.

25. The method of claim 24, wherein the step of receiving, by the first user, n public encryption keys of the second user is comprised of the step of receiving, by the first user, $P1_2$ and $P2_2$.

26. The method of claim 25, wherein the step of generating, by the first user, n values $a_i = F_1(Si_1, Pi_2, ID_1, ID_2, r_1)$ is comprised of the step of generating, by the first user, $a_1 = h(P1_2 \wedge S1_1 \mod p, ID_1, ID_2, r_1)$ and $a_2 = h(P2_2 \wedge S2_1 \mod p, ID_1, ID_2, r_1)$.

27. The method of claim 26, wherein the step of generating, by the first user, n values $b_i = h_{m-1}(\ldots h_2(h_1(a_1, r_2), r_3), \ldots, r_m)$ is comprised of the step of generating, by the first user, $b_1, = h(a_1, r_2)$ and $b_2 = h(a_2, r_2)$.

28. The method of claim 27, wherein the step of generating key=$h(F_2(b_1, b_2, \ldots, b_n), x)$ is comprised of the step of generating, by the first user, key=$h((b_1, \text{XOR } b_2), x)$.

29. The method of claim 28, wherein the step of encrypting, by the first user, a message using key is comprised of the step of encrypting, by the first user, a message using key, where the message is digitally signed by the first user.

30. The method of claim 29, wherein the step of appending to the encrypted message $r_1, r_2, \ldots, r_m$, x, $ID_1$, and $ID_2$ is comprised of the step of appending to the encrypted message $r_1, r_2$, x, $ID_1$, and $ID_2$.

31. The method of claim 30, wherein the step of generating, by the first user, n values $a_i = F_1(Si_1, Pi_2, ID_1, ID_2, r_1)$ is comprised of the step of generating, by the first user, $a_1 = h(P1_2 \wedge S1_1 \mod p, ID_1, ID_2, r_1)$ and $a_2 = h(P2_2 \wedge S2_1 \mod p, ID_1, ID_2, r_1)$, where $r_1$, is an access restriction selected from the group consisting of time, group affiliation, corporate affiliation, and cell hierarchy.

32. The method of claim 31, wherein the step of generating, by the first user, n values $b_i = h_{m-1}(\ldots h_2(h_1(a_1, r_2), r_3), \ldots, r_m)$ is comprised of the step of generating, by the first user, $b_1, = h(a_1, r_2)$ and $b_2 = h(a_2, r_2)$, where $r_2$ is an access restriction selected from the group consisting of time, group affiliation, corporate affiliation, and cell hierarchy.

33. The method of claim 32, further comprising the steps of:
   a) sending securely, by the first user, $S1_1$ to a first escrow agent of the first user;
   b) sending securely, by the first user, $S2_1$ to a second escrow agent of the first user;
   c) sending securely, by the second user, $S1_2$ to a first escrow agent of the second user; and
   d) sending securely, by the second user, $S2_2$ to a second escrow agent of the second user.

34. The method of claim 33, wherein the step of sending securely, by the first user, $S1_1$, to a first escrow agent of the first user is comprised of the steps of:
   a) generating, by the first user, a secret key $t1_1$;
   b) generating, by the first user, $tp1_1 = g \wedge t1_1 \mod p$;
   c) having, by the first user's first escrow agent, a secret key $S_{EA11}$;
   d) receiving, by the first user, $p_{EA11} = g \wedge S_{EA11} \mod p$ from the first user's first escrow agent;
   e) generating, by the first user, $k1_1 = p_{EA11} \wedge t1_1 \mod p$;
   f) encrypting, by the first user, $S1_1$ using $k1_1$ as a key to an encryption function E, where the result is denoted as $E_{k11}(S1_1)$;
   g) receiving, by the first user, a unique identifier $ID_{CA1}$ of a certifying authority of the first user;
   h) signing digitally, by the first user, $tp1_1$, $E_{k11}(S1_1)$, and $ID_{CA1}$; and
   i) sending the result of step (h) to the first escrow agent of the first user.

35. The method of claim 34, wherein the step of sending securely, by the first user, $S2_1$ to a second escrow agent of the first user is comprised of the steps of:
   a) generating, by the first user, a secret key $t2_1$;
   b) generating, by the first user, $tp2_1 = g \wedge t2_1, \mod p$;
   c) having, by the first user's second escrow agent, a secret key $S_{EA21}$;
   d) receiving, by the first user, $p_{EA21} = g \wedge S_{EA21} \mod p$ from the first user's second escrow agent;
   e) generating, by the first user, $k2_1 = p_{EA21} \wedge t2_1 \mod p$;
   f) encrypting, by the first user, $S2_1$ using $k2_1$ as a key to an encryption function E, where the result is denoted as $E_{k21}(S2_1)$;
   g) signing digitally, by the first user, $tp2_1$, $E_{k21}(S2_1)$, and $ID_{CA1}$; and
   h) sending the result of step (g) to the second escrow agent of the first user.

36. The method of claim 35, wherein the step of sending securely, by the second user, $S1_2$ to a first escrow agent of the second user is comprised of the steps of:
   a) generating, by the second user, a secret key $t1_2$;
   b) generating, by the second user, $tp1_2 = g \wedge t1_2 \mod p$;
   c) having, by the second user's first escrow agent, a secret key $S_{EA12}$;
   d) receiving, by the second user, $p_{EA12} = g \wedge S_{EA12} \mod p$ from the second user's first escrow agent;
   e) generating, by the second user, $k1_2 = p_{EA12} \wedge t1_2 \mod p$;
   f) encrypting, by the second user, $S1_2$ using $k1_2$ as a key to an encryption function E, where the result is denoted as $E_{k12}(S1_2)$;
   g) receiving, by the second user, a unique identifier $ID_{CA2}$ of a certifying authority of the second user;
   h) signing digitally, by the second user, $tp1_2$, $E_{k12}(S1_2)$, and $ID_{CA2}$; and
   i) sending the result of step (h) to the first escrow agent of the second user.

37. The method of claim 36, wherein the step of sending securely, by the second user, $S2_2$ to a second escrow agent of the second user is comprised of the steps of:
   a) generating, by the second user, a secret key $t2_2$;
   b) generating, by the second user, $tp2_2 = g \wedge t2_2 \mod p$;
   c) having, by the second user's second escrow agent, a secret key $S_{EA22}$;
   d) receiving, by the second user, $p_{EA22} = g \wedge S_{EA22} \mod p$ from the second user's second escrow agent;
   e) generating, by the second user, $k2_2 = p_{EA22} \wedge t2_2 \mod p$;
   f) encrypting, by the second user, $S2_2$ using $k2_2$ as a key to an encryption function E, where the result is denoted as $E_{k22}(S2_2)$;
   g) signing digitally, by the second user, $tp2_2$, $E_{k22}(S2_2)$, and $ID_{CA2}$; and
   h) sending the result of step (g) to the second escrow agent of the second user.

38. The method of claim 37, further comprising the steps of:
   a) authenticating, by the first escrow agent of the first user, the first user's digital signature;
   b) reconstructing, by the first escrow agent of the first user, $k1_1 = tp1_1 \wedge S_{EA11} \mod p$;
   c) decrypting, by the first escrow agent of the first user, $E_{k11}(S1_1)$ using the result of step (b) to recover $S1_1$;
   d) generating, by the first escrow agent of the first user, $p1_1 = g \wedge S1_1 \mod p$;
   e) signing digitally, by the first escrow agent of the first user, $p1_1$ and $ID_1$;
   f) sending the result of step (e) to the certifying authority of the first user;
   g) authenticating, by the second escrow agent of the first user, the first user's digital signature;
   h) reconstructing, by the second escrow agent of the first user, $k2_1 = tp2_1 \wedge S_{EA21} \mod p$;
   i) decrypting, by the second escrow agent of the first user, $E_{k21}(S2_1)$ using the result of step (h) to recover $S2_1$;
   j) generating, by the second escrow agent of the first user, $p2_1 = g \wedge S2_1 \mod p$;
   k) signing digitally, by the second escrow agent of the first user, $p2_1$ and $ID_1$;
   l) sending the result of step (k) to the certifying authority of the first user;
   m) authenticating, by the first escrow agent of the second user, the second user's digital signature;
   n) reconstructing, by the first escrow agent of the second user, $k1_2 = tp1_2 \wedge S_{EA12} \mod p$;
   o) decrypting, by the first escrow agent of the second user, $E_{k12}(S1_2)$ using the result of step (n) to recover $S1_2$;
   p) generating, by the first escrow agent of the second user, $p1_2 = g \wedge S1_2 \mod p$;
   q) signing digitally, by the first escrow agent of the second user, $p1_2$ and $ID_2$;
   r) sending the result of step (q) to the certifying authority of the second user;
   s) authenticating, by the second escrow agent of the second user, the second user's digital signature;
   t) reconstructing, by the second escrow agent of the second user, $k2_2 = tp2_2 \wedge S_{EA22} \mod p$;

u) decrypting, by the second escrow agent of the second user, $E_{k22}(S2_2)$ using the result of step (t) to recover $S2_2$;

v) generating, by the second escrow agent of the second user, $p2_2 = g \wedge S2_2 \mod p$;

w) signing digitally, by the second escrow agent of the second user, $p2_2$ and $ID_2$; and $ID_2$; and x) sending the result of step (w) to the certifying authority of the second user.

39. The method of claim 38, further comprising the steps of:

a) verifying, by the certifying authority of the first user, the digital signature of the first escrow agent of the first user;

b) verifying, by the certifying authority of the first user, the digital signature of the second escrow agent of the first user;

c) signing digitally, by the certifying authority of the first user, the digitally signed message received from the first escrow agent of the first user, the digitally signed message of the second escrow agent of the first user, and $ID_1$;

d) sending the result of step (c) to a public directory;

e) verifying, by the certifying authority of the second user, the digital signature of the first escrow agent of the second user;

f) verifying, by the certifying authority of the second user, the digital signature of the second escrow agent of the second user;

g) signing digitally, by the certifying authority of the second user, the digitally signed message received from the first escrow agent of the second user, the digitally signed message of the second escrow agent of the second user, and $ID_2$; and h) sending the result of step (g) to a public directory.

40. The method of claim 39, wherein the step of transmitting the result of step (k) to a storage medium is comprised of the step of transmitting the result of step (k) to a storage medium of the second user.

41. The method of claim 39, wherein the step of transmitting the result of step (k) to a storage medium is comprised of the step of transmitting the result of step (k) to a storage medium of the first user.

42. The method of claim 41, further comprising the steps of:

a) transmitting, by the first user, $r_1$, $r_2$, x, $ID_1$, and $ID_2$ to the second user;

b) requesting, by the first user, that the second user reconstruct key;

c) reconstructing key by the second user;

d) transmitting, by the second user, key to the first user;

e) retrieving, by the first user, the encrypted message from the storage medium of the first user; and f) decrypting, by the first user, the encrypted message using key.

43. The method of claim 40, further comprising the steps of:

a) retrieving, by the second user, the result of step (k) stored in the storage medium of the second user;

b) receiving, by the second user, $P1_1$ and $P1_2$;

c) reconstructing, by the second user, $a_1 = h(P1_1 \wedge S1_2 \mod p, ID_1, ID_2, r_1)$ and $a_2 = h(P2_1 \wedge S2_2 \mod p, ID_1, ID_2, r_1)$;

d) reconstructing, by the second user, $b_1 = h(a_1, r_2)$ and $b_2 = h(a_2, r_2)$;

e) reconstructing, by the second user, key=$h((b_1 \text{ XOR } b_2)x)$;

f) decrypting, by the second user, using key the encrypted message which was digitally signed by the first user; and g) verifying, by the second user, the first user's digital signature.

44. The method of claim 43, further comprising the steps of:

a) obtaining authorization, by a third party, from an appropriate authority to gain access to secure communications from the first user to the second user restricted by $r_1$;

b) signing digitally, by the appropriate authority, $ID_1$, $ID_2$, and $r_1$;

c) sending the result of step (b) to the first and second escrow agents of the first user;

d) generating, by the first escrow agent of the first user, $a_1 = h(P1_2 \wedge S1_1 \mod p, ID_1, ID_2, r_1)$;

e) signing digitally, by the first escrow agent of the first user, $a_1$, $ID_1$, and $ID_2$;

f) sending the results of step (e) to the third party;

g) generating, by the second escrow agent of the first user, $a_2 = h(P2_2 \wedge S2_1 \mod p, ID_1, ID_2, r_1)$;

h) signing digitally, by the second escrow agent of the first user, $a_2$, $ID_1$, and $ID_2$;

i) sending the results of step (h) to the third party;

j) obtaining, by the third party, the transmission by the first user of the result of step (k) of claim 1 to the storage medium of the second user;

k) generating, by the third party, $b_1 = h(a_1, r_2)$ and $b_2 = h(a_2, r_2)$, where the third party knows $r_2$ from step (j);

l) reconstructing, by the third party, key=$h((b_1 \text{ XOR } b_2), x)$, where the third party knows x from step (j);

m) decrypting the digitally signed message sent from the first user to the second user that was encrypted with key; and n) verifying the digital signature of the first user.

45. The method of claim 43, further comprising the steps of:

a) obtaining authorization, by a third party, from an appropriate authority to gain access to secure communications from the first user to the second user restricted by $r_1$;

b) signing digitally, by the appropriate authority, $ID_1$, $ID_2$, and $r_1$;

c) sending, by the appropriate authority, the result of step (b) to the first and second escrow agents of the second user;

d) reconstructing, by the first escrow agent of the second user, $a_1 = h(P1_1 \wedge S1_2 \mod p, ID_1, ID_2, r_1)$;

e) signing digitally, by the first escrow agent of the second user, $a_1$, $ID_1$, and $ID_2$;

f) sending, by the first escrow agent of the second user, the result of step (e) to the third party;

g) reconstructing, by the second escrow agent of the second user, $a_2 = h(P2_1 \wedge S2_2 \mod p, ID_1, ID_2, r_1)$;

h) signing digitally, by the second escrow agent of the second user, $a_2$, $ID_1$, and $ID_2$;

i) sending, by the second escrow agent of the second user, the result of step (h) to the third party;

j) obtaining, by the third party, the transmission by the first user of the result of step (k) of claim 1 to the storage medium of the second user;

k) generating, by the third party, $b_1=h(a_1,r_2)$ and $b_2=h(a_2,r_2)$, where the third party knows $r_2$ from step (j);

l) reconstructing, by the third party, key=$h((b_1$ XOR $b_2),x)$, where the third party knows x from step (j);

m) decrypting the digitally signed message sent from the first user to the second user that was encrypted with key; and n) verifying the digital signature of the first user.

46. The method of claim 43, further comprising the steps of:

a) obtaining authorization, by a third party, from an appropriate authority to gain access to secure communications from the first user to the second user restricted by $r_1$ and $r_2$;

b) signing digitally, by the appropriate authority, $ID_1$, $ID_2$, $r_1$ and $r_2$;

c) sending, by the appropriate authority, the result of step (b) to the first and second escrow agents of the first user;

d) generating, by the first escrow agent of the first user, $b_1=h(h(P1_2 \wedge S1_1 \mod p, ID_1, ID_2, r_1),r_2)$;

e) signing digitally, by the first escrow agent of the first user, $b_1$, $ID_1$, and $ID_2$;

f) sending, by the first escrow agent of the first user, the result of step (e) to the third party;

g) generating, by the second escrow agent of the first user, $b_2=h(h(P2_2 \wedge S2_1 \mod p, ID_1, ID_2, r_1),r_2)$;

h) signing digitally, by the second escrow agent of the first user, $b_2$, $ID_1$, and $ID_2$;

i) sending, by the second escrow agent of the first user, the result of step (h) to the third party;

j) obtaining, by the third party, the transmission by the first user of the result of step (k) of claim 1 to the storage medium of the second user;

k) reconstructing, by the third party, key=$h((b_1$ XOR $b_2),x)$, where the third party knows x from step (j);

l) decrypting, by the third party, the digitally signed message sent from the first user to the second user that was encrypted with key; and m) verifying the digital signature of the first user.

47. The method of claim 43, further comprising the steps of:

a) obtaining authorization, by a third party, from an appropriate authority to gain access to secure communications from the first user to the second user restricted by $r_1$ and $r_2$;

b) signing digitally, by the appropriate authority, $ID_1$, $ID_2$, $r_1$ and $r_2$;

c) sending, by the appropriate authority, the result of step (b) to the first and second escrow agents of the second user;

d) generating, by the first escrow agent of the second user, $b_1=h(h(P1_1 \wedge S1_2 \mod p, ID_1, ID_2, r_1),r_2)$;

e) signing digitally, by the first escrow agent of the second user, $b_1$, $ID_1$, and $ID_2$;

f) sending, by the first escrow agent of the second user, the result of step (e) to the third party;

g) generating, by the second escrow agent of the second user, $b_2=h(h(P2_1 \wedge S2_2 \mod p, ID_1, ID_2, r_1),r_2)$;

h) signing digitally, by the second escrow agent of the second user, $b_2$, $ID_1$, and $ID_2$;

i) sending, by the second escrow agent of the second user, the result of step (h) to the third party;

j) obtaining, by the third party, the transmission by the first user of the result of step (k) of claim 1 to the storage medium of the second user;

k) reconstructing, by the third party, key=$h((b_1$ XOR $b_2),x)$, where the third party knows x from step (j);

l) decrypting, by the third party, the digitally signed message sent from the first user to the second user that was encrypted with key; and m) verifying the digital signature of the first user.

48. The method of claim 1, wherein the step of generating key=$h(F_2(b_1, b_2, \ldots, b_n),x)$ is comprised of the step of key=$h((b_1$ XOR $b_2$ XOR $b_3 \ldots$ XOR $b_n),x)$, where XOR is an exclusive-or function.

49. The method of claim 1, wherein the step of encrypting, by the first user, a message using key is comprised of the step of encrypting, by the first user, a message digitally signed by the first user.

50. The method of claim 1, wherein the step of encrypting, by the first user, a message using key is comprised of encrypting, by the first user, a message using key, where the message is a second key $key_2$.

51. The method of claim 50, further comprising the steps of:

a) encrypting, by the first user, a second message using $key_2$; and b) storing, by the first user, the result of step (a) in the storage medium.

52. The method of claim 51, wherein the step of transmitting the result of step (k) to a storage medium is comprised of the step of transmitting the result of step (k) to a storage medium of the second user.

53. The method of claim 52, further comprising the steps of:

a) receiving, by the second user, the n public encryption keys of the first user, where $Pi_1$ denotes the $i^{th}$ public encryption key of the first user;

b) receiving, by the second user, a unique identifier $ID_1$ of the first user;

c) reconstructing, by the second user, n values $a_i=F_1(Si_2, Pi_1, ID_1, ID_2, r_1)$;

d) reconstructing, by the second user, n values $b_i=h_{m-1}(\ldots h_2(h_1(a_1, r_2),r_3), \ldots, r_m)$;

e) reconstructing, by the second user, key=$h(F_2(b_1, b_2, \ldots, b_n),x)$;

f) retrieving, by the second user, the encrypted $key_2$ from the storage medium of the second user;

g) decrypting, by the second user, the encrypted $key_2$ using key;

h) retrieving, by the second user, the encrypted second message from the storage medium of the second user; and i) decrypting, by the second user, the encrypted second message using $key_2$.

* * * * *